United States Patent
Kurimura et al.

(10) Patent No.: US 9,067,398 B2
(45) Date of Patent: Jun. 30, 2015

(54) METHOD FOR DISASSEMBLING BONDED BODY, AND ADHESIVE

(75) Inventors: Hiroyuki Kurimura, Shibukawa (JP); Isamu Ichikawa, Shibukawa (JP); Yoshitsugu Goto, Shibukawa (JP)

(73) Assignee: DENKI KAGAKU KOGYO KABUSHIKI KAISHA, Tokyo (JP)

( * ) Notice: Subject to any disclaimer, the term of this patent is extended or adjusted under 35 U.S.C. 154(b) by 17 days.

(21) Appl. No.: 13/819,908

(22) PCT Filed: Aug. 29, 2011

(86) PCT No.: PCT/JP2011/069477
§ 371 (c)(1), (2), (4) Date: Mar. 18, 2013

(87) PCT Pub. No.: WO2012/029718
PCT Pub. Date: Mar. 8, 2012

(65) Prior Publication Data
US 2013/0174986 A1   Jul. 11, 2013

(30) Foreign Application Priority Data
Sep. 1, 2010 (JP) .................... 2010-195342

(51) Int. Cl.
B32B 38/10 (2006.01)
B32B 43/00 (2006.01)
C09J 133/02 (2006.01)
C09J 163/00 (2006.01)

(52) U.S. Cl.
CPC .......... *B32B 43/006* (2013.01); *Y10T 156/1158* (2015.01); *B32B 38/10* (2013.01); *C08L 2312/00* (2013.01); *C09J 133/02* (2013.01); *C09J 163/00* (2013.01)

(58) Field of Classification Search
CPC  B32B 38/10; B32B 43/006; Y10T 156/1153; Y10T 156/1917; Y10T 156/1158; Y10T 156/1911
See application file for complete search history.

(56) References Cited

U.S. PATENT DOCUMENTS

| | | | |
|---|---|---|---|
| 5,497,747 A | 3/1996 | Nakano et al. | |
| 5,976,955 A * | 11/1999 | Hodges | 438/464 |
| 6,814,832 B2 * | 11/2004 | Utsunomiya | 156/230 |
| 2005/0003131 A1 | 1/2005 | Ishikawa et al. | |
| 2005/0173052 A1 * | 8/2005 | Mitarai | 156/247 |
| 2007/0142528 A1 | 6/2007 | Oshima et al. | 524/430 |
| 2009/0030107 A1 | 1/2009 | Watanabe et al. | 522/171 |
| 2009/0035580 A1 * | 2/2009 | Chino et al. | 428/411.1 |
| 2009/0133820 A1 * | 5/2009 | Sato et al. | 156/247 |
| 2009/0216170 A1 * | 8/2009 | Robinson et al. | 602/60 |
| 2010/0041211 A1 * | 2/2010 | Noda et al. | 438/464 |
| 2011/0067808 A1 * | 3/2011 | Nishio et al. | 156/247 |
| 2012/0205043 A1 | 8/2012 | Kurimura et al. | 156/275.5 |

FOREIGN PATENT DOCUMENTS

| | | |
|---|---|---|
| CN | 1882655 A | 12/2006 |
| CN | 101146837 A | 3/2008 |
| CN | 102574951 A | 7/2012 |
| JP | 64-85209 | 3/1989 |
| JP | 6-264033 | 9/1994 |
| JP | 7-82544 | 3/1995 |
| JP | 2001-212900 | 8/2001 |
| JP | 2001-323228 | 11/2001 |
| JP | 2002-127292 | 5/2002 |
| JP | 2003-286464 | 10/2003 |
| JP | 2003-286464 A | 10/2003 |
| JP | 2003-313510 | 11/2003 |
| JP | 2004-253612 | 9/2004 |
| JP | 2006-111716 | 4/2006 |
| JP | 2006-152308 | 6/2006 |
| JP | 2006-188586 | 7/2006 |
| JP | 2011-125949 | 6/2011 |

OTHER PUBLICATIONS

PCT/IB/338 for PCT/JP2011/069477; mailed Mar. 21, 2013; 1 page.
PCT/ISA/237 for PCT/JP2011/069477; mailed Nov. 29, 2011; 4 pages.

* cited by examiner

*Primary Examiner* — Philip Tucker
*Assistant Examiner* — Nickolas Harm
(74) *Attorney, Agent, or Firm* — Stein IP, LLC

(57) ABSTRACT

Provided is a method for disassembling a bonded body, whereby the bonded body can be easily disassembled and peeled. The method for disassembling a bonded body formed by bonding substrates with an adhesive comprises irradiating light having a wavelength of 280 nm or more such that irradiation energy is 1000-5000000 mJ/cm$^2$ at a wavelength of 365 nm while heating the bonded body to 150° C.-300° C.

16 Claims, No Drawings

METHOD FOR DISASSEMBLING BONDED BODY, AND ADHESIVE

CROSS-REFERENCE TO RELATED APPLICATIONS

This application is a national stage application of PCT Application No. PCT/JP2011/069477, filed Aug. 29, 2011, which claims the benefit of Japanese Application No. 2010-195342 filed Sep. 1, 2010, in the Japanese Intellectual Property Office, the disclosures of which are incorporated herein by reference.

BACKGROUND OF THE INVENTION

1. Field of the Invention

The present invention relates to a method for disassembling a bonded body adhered by an adhesive. The present invention also relates to an adhesive suitable for the method for disassembling a bonded body according to the present invention.

2. Description of the Related Art

Conventionally, optical lens, prism, array, silicon wafer, and semiconductor mounted components, etc has been mechanical immobilization by screws and bolts. However, due to the recent trend of size reduction and thinning of parts, there is an increase in immobilization of parts by an adhesive with objectives to improve productivity such as yield and to improve distortion.

Along with the increase in immobilization of components by an adhesive, highly reliable adhesives having strong adhesive strength as well as resistance against heat or moisture etc. have come to be in the market lineup. On the other hand, a problem that has come to a recent close-up is that once adhered, it is difficult to disassemble. Especially for optical lens, prism, array, silicon wafer, and semiconductor mounted components etc., position misalignment during adherence will lead to substantial reduction of yield since each single component is expensive. For instance, solvents such as organic solvents, strong acids, or strong alkalis are used for disassembly of adhesives. Because these involve use of large amounts of solvent for long periods of time, there was a problem of large burdens on the human body and the environment.

In order to solve these problems, there is a demand for improvement of immobilization accuracy technology in adhering components, as well as disassemblable adhesives and disassembling methods which allow easy disassembling or peeling of adhesives having superior durability.

On such background, methods of irradiating UV light for disassembling or peeling, and adhesives are disclosed, (Patent Documents 1-7).

Adhesive sheets which can be easily peeled from an adherend by heat treatment at 100° C.-280° C., and methods for manufacturing electronic components employing the same are disclosed (Patent Document 8-10).

PRIOR ART DOCUMENT

Patent Documents

Patent Document 1
Japanese Published Unexamined Patent Application Publication No. 2006-188586
Patent Document 2
Japanese Published Unexamined Patent Application Publication No. Hei 6(1994)-264033
Patent Document 3
Japanese Published Unexamined Patent Application Publication No. 2001-212900
Patent Document 4
Japanese Published Unexamined Patent Application Publication No. 2003-286464
Patent Document 5
Japanese Published Unexamined Patent Application Publication No. 2006-111716
Patent Document 6
Japanese Published Unexamined Patent Application Publication No. 2003-313510
Patent Document 7
Japanese Published Unexamined Patent Application Publication No. 2011-125949
Patent Document 8
Japanese Published Unexamined Patent Application Publication No. 2001-323228
Patent Document 9
Japanese Published Unexamined Patent Application Publication No. 2004-253612
Patent Document 10
Japanese Published Unexamined Patent Application Publication No. 2006-152308

SUMMARY OF THE INVENTION

However, the conventional art, which sacrifices adhesiveness of adhesives or adhesive sheets in order to render disassemblability or peelability, cannot satisfy recent demand for heat resistance, moisture resistance, and light resistance required when immobilizing components. More particularly, in disassembling or peeling by heating or UV, heat or light resistance is largely sacrificed because foaming agents which foam upon heating or by UV are formulated therein, or heat or light-labile functionalities are introduced into adhesives. Adhesives which can be disassembled or peeled in water or warm water will have low heat resistance or moisture resistance because they are easily peeled under high temperature and humidity conditions.

The present invention provides, for example, in correspondence to such problems, a versatile method wherein the bonded body can be easily disassembled or peeled even with an adhesive having superior heat resistance, moisture resistance, and light resistance. The present invention also provides an adhesive suitable for use in the method for disassembling a bonded body according to the present invention.

In one aspect, the present invention is a method for disassembling a bonded body formed by bonding substrates with an adhesive, comprising irradiating light having a wavelength of 280 nm or more such that irradiation energy is 1000-5000000 mJ/cm$^2$ at a wavelength of 365 nm while heating the bonded body to 150° C.-300° C.

In one embodiment of the method for disassembling a bonded body according to the present invention, the adhesive employed for the bonded body is an acrylic and/or epoxy adhesive.

In another embodiment of the method for disassembling a bonded body according to the present invention, the adhesive employed for the bonded body contains (A) a (meth)acrylate and (B) a polymerization initiator.

In a further embodiment of the method for disassembling a bonded body according to the present invention, the adhesive employed for the bonded body is an ultraviolet curable acrylic adhesive containing (A-1) one or two or more (meth)acrylates having one or more (meth)acryloyl groups at a molecular terminal or on a side chain, and having a main chain backbone selected from the group consisting of polybutadiene, polyisoprene, and a hydrogenated form of these two, (A-2) isobornyl (meth)acrylate, (A-3) a hydroxyl group-containing (meth) acrylate, and (B-1) a photopolymerization initiator.

In a further embodiment of the method for disassembling a bonded body according to the present invention, the adhesive employed for the bonded body is an ultraviolet curable acrylic adhesive containing (A-4) a multifunctional (meth)acylate, and (B-1) a photopolymerization initiator.

In a further embodiment of the method for disassembling a bonded body according to the present invention, the adhesive employed for the bonded body is a room temperature curable acrylic adhesive containing (A-5) a dicyclopentenyloxyalkyl (meth)acrylate, (A-6) an alkyl(meth)acrylate, (A-7) a hydroxyl group-containing (meth)acrylate, (B-2) a radical polymerization initiator, and (C) a degradation accelerator.

In a further embodiment of the method for disassembling a bonded body according to the present invention, the adhesive employed for the bonded body is an epoxy adhesive.

In a further embodiment of the method for disassembling a bonded body according to the present invention, at least one of the substrates is a transparent substrate that transmits light at 280 nm or more.

In a further embodiment of the method for disassembling a bonded body according to the present invention, at least one of the substrates do not transmit light at 280 nm or more.

In a further embodiment of the method for disassembling a bonded body according to the present invention, irradiation light source is one or two or more of the group consisting of a mercury lamp, a metal halide lamp, a xenon lamp, and a flash lamp enclosing xenon gas.

In a further embodiment of the method for disassembling a bonded body according to the present invention, the peak wavelength of the irradiated light is 400 nm or less.

In a further embodiment of the method for disassembling a bonded body according to the present invention, the peak wavelength of the irradiated light is 280-400 nm.

In a further embodiment of the method for disassembling a bonded body according to the present invention, the illuminance of light during disassembly is 10-1000 mW/cm$^2$ at a wavelength of 365 nm.

In another aspect, the present invention is an adhesive used for the method for disassembling a bonded body described above according to the present invention.

In one embodiment of the adhesive according to the present invention, the adhesive is an acrylic adhesive.

In another embodiment of the adhesive according to the present invention, the acrylic adhesive contains (A) a (meth) acrylate and (B) a polymerization initiator.

In another embodiment of the adhesive according to the present invention, the adhesive is an epoxy adhesive.

The present invention, for example, has the effect wherein the bonded body can be easily disassembled or peeled even with an adhesive having superior heat resistance, moisture resistance, and light resistance. Accordingly, the method is considered to have extremely high versatility since the bonded body can be disassembled regardless of the type of adhesive.

Additional aspects and/or advantages of the invention will be set forth in part in the description which follows and, in part, will be obvious from the description, or may be learned by practice of the invention.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In the present invention, a bonded body, which is formed by bonding substrates with an adhesive, is disassembled by irradiation of light having a wavelength of 280 nm or more while heating the bonded body to 150° C.-300° C., which reduces adhesiveness.

The temperature of the bonded body is, in light of disassemblability and substrate deterioration by heat, preferably within the range of 150° C.-300° C., more preferably within the range of 180° C.-290° C., and most preferably within the range of 200° C.-280° C.

In order to utilize the radiation heat by the irradiated light, it is preferred that at least one of the substrates do not transmit light at 280 nm or more. The bonded body is effectively heated by the substrate absorbing light at 280 nm or more. Such substrates include, but are not limited to, for example inorganic substrates such as glass or quartz, silicon, various metals and metal oxides; organic substrates such as polymethyl methacrylate, polycarbonate, cycloolefin polymer, and olefin, as well as wood. Glass or quartz, polymethyl methacrylate, polycarbonate, cycloolefin polymer, and olefin etc. may have printings on the surface.

The wavelength, desirably the peak wavelength of the irradiated light is preferably 280 nm or more, more preferably more than 280 nm. 280 nm or more will have higher practicality because substrates transmitting these are inexpensive and abundant. In light of practicality, the wavelength, desirably the peak wavelength of the irradiated light is preferably 300 nm or more. However, since the light energy will become smaller when the wavelength of the irradiated light is too long, the peak wavelength of the irradiated light is preferably 400 nm or less, more preferably 380 nm or less.

At least one of the substrates employed in the disassembling method of the present invention is preferably a transparent substrate that transmits light at 280 nm or more. Transparent substrates include inorganic substrates such as glass, quartz, and calcium fluoride; and organic substrates such as polymethyl methacrylate, polycarbonate, cycloolefin polymer, and olefin. Among these, inorganic substrates made of one or two or more of the group consisting of glass, quartz, and calcium fluoride are preferred in that they are not easily deteriorated by irradiation of light.

Adhesives employed in the disassembling method of the present invention include, for example, acrylic adhesives, epoxy adhesives, urethane adhesives, polyester adhesives, silicone adhesives, polyimide adhesives, ene-thiol adhesives, hotmelt adhesives such as olefin, cyanoacrylate adhesives, modified silicone adhesives, and fluorine-based adhesives. Among these, acrylic and/or epoxy adhesives are preferred in that they have superior heat resistance, moisture resistance, and light resistance, and the ability to disassemble bonded body not easily disassembled with conventional methods. Acrylic or epoxy adhesives are broadly employed as highly reliable structural adhesives. The present invention is characterized in that it can disassemble bonded bodies with acrylic or epoxy adhesives which are considered difficult to disassemble.

Highly reliable structural adhesives are, for example, adhesives which have high elastic modulus and adhesive strength and show only little reduction in adhesive strength in durability tests such as heat, moisture, and light resistance. Highly reliable structural adhesives preferably have a storage elastic modulus of 1000 MPa or higher, more preferably an adhesive strength retention rate after various durability tests at 50% or higher.

Acrylic adhesives include, for example, heat curable acrylic adhesives, ultraviolet curable acrylic adhesives, and room temperature curable acrylic adhesives. Epoxy adhesives include, for example, two-part heat curable epoxy adhesives, one-part heat curable epoxy adhesives, and ultraviolet curable epoxy adhesives. Among these, acrylic adhesives are preferred in that effect is large. Among acrylic adhesives, ultraviolet curable acrylic adhesives and/or room temperature curable acrylic adhesives are preferred in that effect is large.

Acrylic adhesives preferably contain (A) a (meth)acrylate and (B) a polymerization initiator. (B) The polymerization initiator for polymerizing the (meth)acrylate is preferably (B-1) a photopolymerization initiator or (B-2) a radical polymerization initiator.

<Ultraviolet Curable Acrylic Adhesives>

Ultraviolet curable acrylic adhesives preferably contain (A) a (meth)acrylate and (B-1) a photopolymerization initiator. Among (A) the (meth)acrylates, any one of the following (I) and (II) is preferred in that effect is large:
 (I) a (meth)acrylate that uses (A-1) one or two or more (meth)acrylates having one or more (meth)acryloyl groups at a molecular terminal or on a side chain, and having a main chain backbone selected from the group consisting of polybutadiene, polyisoprene, and a hydrogenated form of these two, (A-2) isobornyl(meth)acrylate, (A-3) a hydroxyl group-containing (meth)acrylate in combination, and
 (II) a (meth)acrylate containing (A-4) a multifunctional (meth)acrylate.

It is also possible to use (I) and (II) in combination.

Component (A-1) is (A-1) one or two or more (meth) acrylates having one or more (meth)acryloyl groups at the molecular terminal or on the side chain, and having the main chain backbone selected from the group consisting of polybutadiene, polyisoprene, and a hydrogenated form of these two. The main chain backbone of the (meth)acrylate is one or two or more selected from the group consisting of polybutadiene, polyisoprene, and a hydrogenated form of these two. The (meth)acrylate has one or more (meth)acryloyl groups at the terminal or on the side chain of the main chain backbone. Among these, those having (meth)acryloyl groups at both terminals of the main chain backbone are preferred. The main chain backbone of polybutadiene includes, for example, a low-cis polybutadiene backbone having low 1,4-cis unit proportion, a high-cis polybutadiene backbone having high 1,4-cis unit proportion, and 1,2-polybutadiene back bone. Among these, 1,2-polybutadiene back bone is preferred in that effect is large.

The molecular weight of component (A-1) is preferably 500-5000, more preferably 800-2800. Polystyrene equivalent number average molecular weight as measured in gel permeation chromatography (GPC) is preferably employed as the molecular weight referred to herein.

Component (A-1) includes, for example, NISSO-PB TEAI-1000 available from NIPPON SODA Co., Ltd. (hydrogenated 1,2-polybutadiene back bone urethane acrylate, having (meth)acryloyl groups at both terminals), and NISSO-PB TE-2000 available from NIPPON SODA Co., Ltd. (butadiene-based olygomers methacrylate-modified at both terminals).

Component (A-2) is isobornyl(meth)acrylate. Component (A-2) may be used alone or in combination.

Component (A-3) is a hydroxyl group-containing (meth) acrylate. Component (A-3) may be used alone or in a combination of two or more. The hydroxyl group-containing (meth) acrylate is preferably a monofunctional (meth)acrylate having at least one or more hydroxyl groups within the molecule. Component (A-3) includes, for example, 2-hydroxyethyl(meth)acrylate, 2-hydroxypropyl(meth)acrylate, 2-hydroxybutyl(meth)acrylate, 2-hydroxy-3-phenoxypropyl (meth)acrylate, 2-(meth)acryloyloxyethyl-2-hydroxypropyl phthalate, glycerol mono(meth)acrylate, 1,6-hexanediol mono(meth)acrylate, neopentylglycol mono(meth)acrylate, 4-hydroxycyclohexyl(meth)acrylate, and 1,4-butanediol mono(meth)acrylate. Among these, one or two or more of the group consisting of 2-hydroxyethyl(meth)acrylate, 2-hydroxypropyl(meth)acrylate, and 2-hydroxybutyl(meth)acrylate are preferred, more preferably 2-hydroxyethyl(meth) acrylate, in that effect is large.

The proportion of use of components (A-1), (A-2), and (A-3) is preferably components (A-1):(A-2):(A-3)=30-70: 20-60:1-30, more preferably 40-60:30-50:5-15 by mass ratio in the total 100 parts by mass of components (A-1), (A-2), and (A-3).

(A-4) The multifunctional (meth)acrylate is preferably one or more of the group consisting of 1,3-adamantyl dimethanol di(meth)acrylate, trimethylolpropane tri(meth)acrylate, isocyanurate ethylene oxide-modified di(meth)acrylate, isocyanurate ethylene oxide-modified tri(meth)acrylate, pentaerythritol tri(meth)acrylate, pentaerythritol tetra(meth) acrylate, dimethylolpropane tetra(meth)acrylate, dipentaerythritol penta(meth)acrylate, and dipentaerythritol hexa(meth)acrylate. Among these, trimethylolpropane tri (meth)acrylate is preferred in that effect is large.

(B-1) The photopolymerization initiator includes, for example, benzophenone, 4-phenylbenzophenone, benzoylbenzoic acid, 2,2-diethoxyacetophenone, bisdiethylaminobenzophenone, benzyl, benzoin, benzoylisopropyl ether, benzyldimethylketal, 1-hydroxycyclohexylphenyl ketone, thioxanthone, 1-(4-isopropylphenyl)2-hydroxy-2-methyl propan-1-one, 1-(4-(2-hydroxyethoxy)-phenyl)-2-hydroxy-2-methyl-1-propan-1-one, 2-hydroxy-2-methyl-1-phenyl propan-1-one, camphor quinone, 2,4,6-trimethylbenzoyl-diphenylphosphine oxide, bis(2,4,6-trimethylbenzoyl)-phenylphosphine oxide, 2-methyl-1-(4-(methylthio)phenyl)-2-morpholinopropan-1-one, 2-benzyl-2-dimethylamino-1-(4-morpholinophenyl)-1-butanon-1, bis(2,6-dimethoxybenzoyl)-2,4,4-trimethyl-pentylphosphine oxide, 2-hydroxy-1-{4[4-(2-hydroxy-2-methyl-propionyl)-benzyl]-phenyl}-2-methyl-propan-1-one, 2-dimethylamino-2-(4-methyl-benzyl)-1-(4-morypholin-4-yl-phenyl)-butan-1-one, bis(2,4,6-trimethylbenzoyl)phenylphosphine oxide, 2,4,6-trimethylbenzoyldiphenylphosphine oxide, oxy-phenyl-acetic acid 2-[2-oxo-2-phenyl-acetoxy-ethoxy]-ethyl ester, oxy-phenyl-acetic acid 2-[2-hydroxy-ethoxy]-ethyl ester, and 2-dimethylamino-2-(4-methyl-benzyl)-1-(4-morypholin-4-yl-phenyl)-butan-1-one. The photopolymerization initiator may be used alone or in a combination of two or more. Among these, benzyldimethylketal and/or 2-dimethylamino-2-(4-methyl-benzyl)-1-(4-morypholin-4-yl-phenyl)-butan-1-one are preferred in that effect is large.

In terms of curability, low outgassing, and heat resistance, the amount of (B-1) the photopolymerization initiator used is preferably 0.01-5 parts by mass, more preferably 0.2-3 parts by mass, and most preferably 0.5-2 parts by mass, relative to 100 parts by mass of (meth)acrylate. Sufficient curability can be obtained when the amount of the photopolymerization initiator used is 0.01 parts by mass or more, and low outgassing and superior heat resistance can be obtained at 5 parts by mass or less.

The ultraviolet curable acrylic adhesive preferably uses a silane coupling agent to further improve adherence.

Silane coupling agents include, for example, γ-chloropropyltrimethoxysilane, vinyltrimethoxysilane, vinyltrichlorsilane, vinyltriethoxysilane, vinyl-tris(β-methoxyethoxy)silane, γ-(meth)acryloyloxypropyltrimethoxysilane, β-(3,4-epoxycyclohexyl)ethyltrimethoxysilane, γ-glycidoxypropyltrimethoxysilane, γ-mercaptopropyltrimethoxysilane, γ-aminopropyltriethoxysilane, N-β-(aminoethyl)-γ-aminopropyltrimethoxysilane, N-β-(aminoethyl)-γ-aminopropylmethyldimethoxysilane, and γ-ureidepropyltriethoxysilane. Among these, γ-(meth)acryloyloxypropyltrimethoxysilane is preferred in that effect is large.

The amount of the silane coupling agent used is preferably 0.1-10 parts by mass, more preferably 1-5 parts by mass, relative to 100 parts by mass of (meth)acrylate.

<Room Temperature Curable Acrylic Adhesives>

Room temperature curable acrylic adhesives preferably contain (A) a (meth)acrylate, (B-2) a radical polymerization initiator, and (C) a degradation accelerator. Among (meth) acrylates, it is preferred to use (A-5) a dicyclopentenyloxyalkyl(meth)acrylate, (A-6) an alkyl(meth)acrylate, and (A-7) a hydroxyl group-containing (meth)acrylate in combination in that effect is large. The proportion of use of components (A-5), (A-6), and (A-7) is preferably components (A-5):(A-6):(A-7)=5-35:45-75:5-35, more preferably 10-30:50-70:10-30 by mass ratio in the total 100 parts by mass of components (A-5), (A-6), and (A-7).

Component (A-5) is a dicyclopentenyloxyalkyl(meth) acrylate. Dicyclopentenyloxyalkyl(meth)acrylates include, for example, dicyclopentenyloxyethyl(meth)acrylate, dicyclopentenyloxydiethyleneglycol (meth)acrylate, dicyclopentenyloxytriethyleneglycol (meth)acrylate, and dicyclopentenyloxypropyleneglycol (meth)acrylate. Component (A-5) may be used alone or in a combination of two or more. Among these, dicyclopentenyloxyethyl(meth)acrylate is preferred in that effect is large.

Component (A-6) is an alkyl(meth)acrylate. Alkyl(meth) acrylates include, for example, methyl(meth)acrylate, ethyl (meth)acrylate, propyl(meth)acrylate, butyl(meth)acrylate, hexyl(meth)acrylate, and 2-ethylhexyl(nneth)acrylate. Component (A-6) may be used alone or in a combination of two or more. Among these, methyl(meth)acrylate is preferred in that effect is large.

Component (A-7) is a hydroxyl group-containing (meth) acrylate. Component (A-7) is identical to component (A-3).

Organic peroxides such as cumene hydroperoxide, paramenthane hydroperoxide, tertiary-butyl hydroperoxide, diisopropylbenzene dihydroperoxide, methylethyl ketone peroxide, benzoyl peroxide, and tertiary-butyl peroxybenzoate are preferred as (B-2) the radical polymerization initiator, and one or two or more of these can be used. Among these, cumene hydroperoxide is preferred in that effect is large.

The amount of (B-2) the radical polymerization initiator used is preferably 0.5-10 parts by mass, more preferably 1-7 parts by mass, relative to 100 parts by mass of (meth)acrylate.

(C) The degradation accelerator is preferably those that react with the radical polymerization initiator at room temperatures and produce a radical. Degradation accelerators include, for example, tertiary amines, thiourea derivatives, and metal salts. Tertiary amines include, for example, triethylamine, tripropylamine, tributylamine, and N,N-dimethylparatoluidine. Thiourea derivatives include, for example, 2-mercaptobenzimidazole, methylthiourea, dibutylthiourea, tetramethylthiourea, and ethylenethiourea. Metal salts include, for example, cobalt naphthenate, copper naphthenate, and vanadyl acetylacetonate. One or two or more of these may be used. Among these, metal salt is preferred, and vanadyl acetylacetonate is more preferred in that effect is large.

The amount of (C) the degradation accelerator used is preferably 0.05-5 parts by mass, more preferably 0.1-2 parts by mass, relative to 100 parts by mass of (meth)acrylate.

The acrylic adhesive can use a polymerization inhibitor to improve storage stability. Polymerization inhibitors include, for example, methylhydroquinone, hydroquinone, 2,2-methylen-bis(4-methyl-6-tertiary-butylphenol), catechol, hydroquinone monomethyl ether, monotertiary-butylhydroquinone, 2,5-ditertiary-butylhydroquinone, p-benzoquinone, 2,5-diphenyl-p-benzoquinone, 2,5-ditertiary-butyl-p-benzoquinone, picric acid, citric acid, phenothiazine, tertiary-butyl catechol, 2-butyl-4-hydroxyanisole, and 2,6-ditertiary-butyl-p-cresol. Among these, 2,2-methylen-bis(4-methyl-6-tertiary-butylphenol) is preferred.

The amount of the polymerization inhibitor used is preferably 0.001-3 parts by mass, more preferably 0.1-2 parts by mass, relative to 100 parts by mass of (meth)acrylate.

The room temperature curable acrylic adhesive is preferably used as a two-part room temperature curable acrylic adhesive. An embodiment of the two-part room temperature curable acrylic adhesive includes use as a two-part adhesive. In the two-part form, not all of the essential components of the adhesive of the present invention are mixed during storage, but rather the adhesive is separated into agents A and B, and at least the radical polymerization initiator is stored in agent A and at least the degradation accelerator is stored separately in agent B. In such a case, the two agents can be used as a two-part room temperature curable acrylic adhesive by simultaneously or separately applying to an adherend, bringing them into contact for curing.

<Epoxy Adhesives>

Among epoxy adhesives, ultraviolet curable epoxy adhesives and/or two-part heat curable epoxy adhesives are preferred in that effect is large.

<Ultraviolet Curable Epoxy Adhesives>

Ultraviolet curable epoxy adhesives contain an epoxy resin and a photopolymerization initiator.

Epoxy resins include, for example, alicyclic epoxy resins such as 3,4-epoxycyclohexenylmethyl-3',4'-epoxycyclohexenecarboxylate or a hydrogenated bisphenol A-type epoxy resin; aromatic epoxy resins such as a bisphenol A-type epoxy resin; and aliphatic epoxy resins such as diglycidyl ether of 1,6-hexanediol, triglycidyl ether of glycerin, triglycidyl ether of trimethylolpropane, polyglycidyl ether of sorbitol, and glycidyl ether of neodecanoic acid. An aliphatic epoxy resin refers to an epoxy resin having an aliphatic group not included in an alicyclic epoxy resin as the main back bone.

The photopolymerization initiator is those that produce cations by ultraviolet ray irradiation and initiate polymerization of epoxy groups. Photopolymerization initiators include sulfonium salts, iodonium salts, and diazonium salts. Among these, sulfonium salts are preferred. Among sulfonium salts, examples include trialkylsulfonium salts and triarylsulfonium salts. Among these, triarylsulfonium salts are preferred. Counteranions of salts include, for example, hexafluoroantimonate ions, tris(pentafluoroethyl)trifluorophosphate ions, and hexafluorophosphate ions. Among these, hexafluorophosphate ions are preferred.

The amount of the photopolymerization initiator used is preferably 0.2-20 parts by mass, more preferably 0.5-10 parts by mass, and most preferably 0.7-2 parts by mass, relative to 100 parts by mass of the epoxy resin.

The ultraviolet curable epoxy adhesive preferably uses a silane coupling agent to further improve adherence.

Silane coupling agents include, for example, γ-chloropropyltrimethoxysilane, vinyltrimethoxysilane, vinyltrichlorsilane, vinyltriethoxysilane, vinyl-tris(β-methoxyethoxy)silane, γ-(meth)acryloyloxypropyltrimethoxysilane, β-(3,4-epoxycyclohexyl)ethyltrimethoxysilane, γ-glycidoxypropyltrimethoxysilane, γ-mercaptopropyltrimethoxysilane, γ-aminopropyltriethoxysilane, N-β-(aminoethyl)-γ-aminopropyltrimethoxysilane, N-β-(aminoethyl)-γ-aminopropylmethyldimethoxysilane, and γ-ureidepropyltriethoxysilane. Among these, γ-glycidoxypropyltrimethoxysilane is preferred in that effect is large.

The amount of the silane coupling agent used is preferably 0.1-10 parts by mass, more preferably 1-5 parts by mass, relative to 100 parts by mass of the epoxy resin.

<Two-part Heat Curable Epoxy Adhesives>

As for the two-part heat curable epoxy adhesive, at least the main agent is stored in agent A and at least the curing agent is stored separately in agent B. In such a case, the two agents can be used as a two-part heat curable epoxy adhesive by simultaneously or separately applying to the adherend, bringing them into contact for curing.

Epoxy resins used in the two-part heat curable epoxy adhesive include, for example, aromatic epoxy resins, aliphatic epoxy resin, and alicyclic epoxy resins, similarly to the above. Among these, it is preferred to use aromatic epoxy and alicyclic epoxy resins in combination. When aromatic epoxy and alicyclic epoxy resins are used in combination, the mixing proportion of the aromatic epoxy and alicyclic epoxy resins is preferably aromatic epoxy resin:alicyclic epoxy resin=5-45 parts by mass:55-95 parts by mass, more preferably 15-35 parts by mass:65-85 parts by mass in the total 100 parts by mass of aromatic epoxy and alicyclic epoxy resins.

The curing agent is a component that may cure the epoxy resin. Curing agents include, for example, amine compounds, mercaptan compounds, and acid anhydrides. Among these, amine compounds are preferred. Amine compounds include, for example, diethylenetriamine, triethylenetetramine, metaxylene diamine, diaminodiphenylmethane, diaminodiphenylsulfone, m-phenylenediamine, dicyandiamide, and terminally aminated polypropylene. Among these, terminally aminated polypropylene is preferred.

The amount of the curing agent used is preferably 0.5-1.5 equivalents, more preferably 0.8-1.3 equivalents of active hydrogen in the curing agent, relative to 1 equivalent of epoxy group in the epoxy resin.

When visible light or ultraviolet ray is irradiated to the ultraviolet curable acrylic or epoxy adhesive for curing, it is preferably irradiated to the adhesive at 1-10000 mJ/cm$^2$ at a wavelength of 365 nm, more preferably irradiated at 100-8000 mJ/cm$^2$, and most preferably irradiated at 300-6000 mJ/cm$^2$ in that good curing property and sufficient adhesive strength can be obtained.

In the disassembling method of the present invention, light having a wavelength of 280 nm or more is irradiated at a certain energy or higher from the transparent substrate side of the bonded body joined by an adhesive. If good peelability can be obtained, the bonded body can be easily peeled off by hand.

The irradiation energy of light during disassembly is preferably 1000-5000000 mJ/cm$^2$ at a wavelength of 365 nm, more preferably 10000-3000000 mJ/cm$^2$, and most preferably 28000-2000000 mJ/cm$^2$. Disassembly will become easier if it is 1000 mJ/cm$^2$ or higher, and unproductivity will not be caused if it is 5000000 mJ/cm$^2$ or lower.

The illuminance of light during disassembly is preferably 10-1000 mW/cm$^2$ at a wavelength of 365 nm, more preferably 50-900 mW/cm$^2$, most preferably 100-800 mW/cm$^2$, and further preferably 200 m-500 mW/cm$^2$. Disassembly will become easier if it is 10 mW/cm$^2$ or higher, and unproductivity will not be caused if it is 1000 mW/cm$^2$ or lower.

The irradiation light sources such as a lamp light source or a laser light source are not particularly limited, provided that the emission wavelength is 280 nm or more. Known energy irradiation sources such as a deuterium lamp, a mercury lamp (including a high pressure mercury lamp that uses mercury vapor at 10$^5$ Pa or higher, an ultrahigh pressure mercury lamp that uses mercury vapor at 10$^6$ Pa or higher, and a low pressure mercury lamp that uses mercury vapor at 100 Pa or lower), a xenon lamp, a xenon-mercury hybrid lamp, a halogen lamp, an excimer lamp, an indium lamp, a thallium lamp, an LED lamp, and an electrodeless discharge lamp can be used as the irradiation light source. Among these, a high pressure mercury lamp, an ultrahigh pressure mercury lamp, a metal halide lamp, a xenon lamp, and a flash lamp enclosing xenon gas, which have large irradiation energy, are preferred in terms of the disassemblability of the bonded body.

The method for heating the bonded body is not particularly limited, provided that the bonded body can be heated to 150° C.-300° C. A hot plate or an oven etc. may be employed as the heat source, or the bonded body may be heated with the radiation heat by the irradiated light. Heating the bonded body with the radiation heat by the irradiated light having a certain energy or higher is preferred, because hot plates or ovens etc. will be unnecessary, which is efficient.

EXAMPLE

The present invention will be explained in further detail by way of Examples and Comparative Examples. The present invention is not to be limited to these Examples. Unless particularly described, these were performed at 23° C.

(Production of Adhesives)

For evaluation, adhesives were produced by procedures shown below.

Adhesive (A): Ultraviolet curable Acrylic Adhesive

As (meth)acrylates, 40 parts by mass of isobornyl methacrylate ("LIGHT ESTER IB" available from KYOEISHA CHEMICAL Co., Ltd.), 10 parts by mass of 2-hydroxyethyl methacrylate ("Acryester HO" available from Mitsubishi Rayon Co., Ltd.), 50 parts by mass of hydrogenated 1,2-polybutadiene backbone urethane acrylate ("TEAI-1000" available from NIPPON SODA Co., Ltd., polystyrene equivalent number average molecular weight by GPC of 1200), as the adhesion promotor, 2.5 parts by mass of γ-methacryloyloxypropyltrimethoxysilane ("Silquest A-174" available from Momentive Performance Materials Inc.), and as the photoradical polymerization initiator, 0.5 parts by mass of benzyldimethylketal ("IRGACURE651" available from Ciba Japan K.K.) were sufficiently stirred until each component was dissolved to produce a resin composition.

Adhesive (B): Ultraviolet curable Epoxy Adhesive

As the epoxy compound, 100 parts by mass of 3,4-epoxycyclohexenylmethyl-3',4'-epoxycyclohexenecarboxylate ("Celloxide 2021P" available from Daicel Corporation), as the photocation polymerization initiator, 1.0 part by mass of triarylsulfonium hexafluoroantimonate salt ("Adekaoptomer SP-170" available from ADEKA CORPORATION), and as the adhesion promoter, 3.0 parts by mass of γ-glycidoxypropyltrimethoxysilane ("KBM-403" available from Shin-Etsu Chemical Co., Ltd.) were sufficiently stirred until each component was dissolved to produce a resin composition.

Adhesive (C): Two-part Room temperature Curable acrylic Adhesive

[Agent A] As (meth)acrylates, 20 parts by mass of dicyclopentenyloxyethyl methacrylate ("QM-652" available from Rohm and Haas Company), 57.5 parts by mass of methyl methacrylate ("methyl methacrylate" available from Mitsubishi Rayon Co., Ltd.), 20 parts by mass of 2-hydroxyethyl methacrylate (available from Mitsubishi Rayon Co., Ltd. "Acryester HO"), and as the polymerization initiator, 2.5 parts by mass of cumene hydroperoxide (available from NOF CORPORATION "PERCUMYL H-80") were sufficiently stirred until each component was dissolved to produce a resin composition.

[Agent B] As (meth)acrylates, 20 parts by mass of dicyclopentenyloxyethyl methacrylate ("QM-652" available from Rohm and Haas Company), 57.5 parts by mass of methyl methacrylate ("methyl methacrylate" available from Mitsubishi Rayon Co., Ltd.), 20 parts by mass of 2-hydroxyethyl methacrylate ("Acryester HO" available from Mitsubishi Rayon Co., Ltd.), and as the degradation accelerator, 0.6 parts by mass of vanadyl acetylacetonate ("vanadyl acetylacetonate" available from Shinko Chemical Co., Ltd.) were sufficiently stirred until each component was dissolved to produce a resin composition.

Adhesive (D): Two-part Heat Curable Epoxy Adhesive

[Agent A] As epoxy resins, 24 parts by mass of bisphenol A-type epoxy resin ("YD-6020" available from Tohto Kasei Co., Ltd.), 76 parts by mass of hydrogenated bisphenol A-type epoxy resin ("EXA-7015" available from Dai Nippon Ink and Chemicals. Inc.)

were sufficiently stirred until each component was dissolved to produce a resin composition.

[Agent B] As the curing agent, terminally aminated polypropylene ("D400" available from Mitsui Chemicals, Inc.) was used so that active hydrogen in the curing agents was 1 equivalent, relative to 1 equivalent of epoxy group in the epoxy resin.

Adhesive (E): Ultraviolet curable Acrylic Adhesive (A) as the multifunctional (meth)acrylate, 100 parts by mass of trimethylolpropane triacrylate ("ARONIX M-309" available from TOAGOSEI Co., Ltd., hereinafter abbreviated as (B) as the photopolymerization initiator, 1 part by mass of 2-dimethylamino-2-(4-methyl-benzyl)-1-(4-morpholin-4-yl-phenyl)-butan-1-one ("IRGACURE379" available from Ciba Japan K.K., hereinafter abbreviated as "IRGACURE379"), and (C) as the polymerization inhibitor, 0.1 parts by mass of 2,2-methylen-bis(4-methyl-6-tertiary-butylphenol) ("SUMILIZER MDP-S" available from Sumitomo Chemical Co., Ltd., hereinafter abbreviated as "MDP") were used to produce a resin composition.

(Curing Condition of Adhesives)

For evaluation, adherence test samples were produced by procedures shown below.

Adhesive (A): Ultraviolet curable Acrylic Adhesive

Curing was performed by a curing device that uses an electrodeless discharge lamp available from Fusion UV Systems Japan KK with a condition of integrated light quantity of 4000 mJ/cm$^2$ at a wavelength of 365 nm.

Adhesive (B): Ultraviolet curable Epoxy Adhesive

Curing was performed by a curing device that uses an electrodeless discharge lamp available from Fusion UV Systems Japan KK with a condition of integrated light quantity of 4000 mJ/cm$^2$ at a wavelength of 365 nm.

Adhesive (C): Two-part Room temperature Curable acrylic Adhesive

Agents were mixed at agents A:B=1:1 and cured with a condition of leaving for 24 hours under 23° C., 50% RH atmosphere.

Adhesive (D): Two-part Heat Curable Epoxy Adhesive

Agents were mixed at agents A:B=10:3 and cured with a condition of 150° C., 30 min. The amount of the curing agent used was 0.97 equivalents of active hydrogen in the curing agent, relative to 1 equivalent of epoxy group in the epoxy resin.

Adhesive (E): Ultraviolet curable Acrylic Adhesive

Curing was performed by irradiation of a black light with a condition of integrated light quantity of 500 mJ/cm$^2$ at a wavelength of 365 nm, and then heating at 180° C. for 2 hours in an oven.

(Storage Elastic Modulus Evaluation)

The above adhesives were cured at previously stated curing conditions to prepare 20 mm×5 mm×1 mm test strips. With these test strips, using a tension module DMS210 available from SEICO Electronics Industrial Co., Ltd., temperature sweep was performed with a condition of frequency 1 Hz and distortion 0.05%, dynamic viscoelasticity spectrum was measured in tension mode, and the value of storage elastic modulus E' at 23° C. was obtained.

(Tensile Shear Adhesive Strength Evaluation)

Measuring was performed according to JIS K 6850. Specifically, using a borosilicate glass ("TEMPAX Float" available from SCHOTT AG) 25 mm×25 mm×2.0 mm) and a monocrystalline silicon (25 mm×25 mm×0.7 mm) as adherends with adhesion site diameter of 25 mm×25 mm, the borosilicate glass and the monocrystalline silicon were put together with the resin compositions prepared, and the adhesives were cured at previously stated curing conditions to produce tensile shear adhesive strength test strips. The produced test strips were measured for tensile shear adhesive strength using a tensile tester under the environment of temperature at 23° C. and humidity at 50% at a tension speed of 10 mm/min. Evaluation results are shown in Table 1.

(Heat Resistance Evaluation)

Test strips identical to those for the above tensile shear adhesive strength evaluation were prepared, and the test strips were exposed to an oven with a 200° C. atmosphere for 2 hours. The test strips after exposure were measured for tensile shear adhesive strength using a universal tester under the environment of temperature at 23° C. and humidity at 50% at a tension speed of 10 mm/min. Evaluation results are shown in Table 1.

(Moisture Resistance Evaluation)

Test strips identical to those for the above tensile shear adhesive strength evaluation were prepared, and exposed to a pressure cooker (PCT) with a condition of temperature at 121° C., humidity at 100%, and 2 atm for 24 hours. The test strips after exposure were measured for tensile shear adhesive strength using a universal tester under the environment of temperature at 23° C. and humidity at 50% at a tension speed of 10 mm/min. Evaluation results are shown in Table 1.

(Light Resistance Evaluation)

Test strips identical to those for the above tensile shear adhesive strength evaluation were prepareded, and exposed to a light resistance tester (Fade-Meter, carbon arc lamp) for 100 hours. The test strips after exposure were measured for tensile shear adhesive strength using a universal tester under the environment of temperature at 23° C. and humidity at 50% at a tension speed of 10 mm/min. Evaluation results are shown in Table 1.

Example 1

Peeling/Disassembly Test (1)

Test strips identical to those for the above tensile shear adhesive strength evaluation were prepareded. To the test samples obtained, irradiation was performed from the borosilicate glass side using a high pressure mercury lamp (device used: EYE Grandage ECS-401GX available from EYE GRAPHICS Co., Ltd.) with an illuminance of 340 mW/cm$^2$ at a wavelength of 365 nm under the condition of integrated light quantity shown in Table 1. During irradiation, the test strips were heated by the radiation heat of the high pressure mercury lamp. The test strips after irradiation were measured for tensile shear adhesive strength using a universal tester under the environment of temperature at 23° C. and humidity at 50% at a tension speed of 10 mm/min. The maximum temperature of the bonded body during the peeling/disassembly test was measured by affixing a thermocouple on the monocrystalline silicon side with Kapton tape. Measurement and evaluation results are shown in Table 1.

Example 2

Peeling/Disassembly Test (2)

Test strips identical to those for the above tensile shear adhesive strength evaluation were prepareded. To the test samples obtained, irradiation was performed from the borosilicate glass side using a metal halide lamp (device used: EYE Grandage ECS-401GX available from EYE GRAPHICS Co., Ltd.) with an illuminance of 340 mW/cm$^2$ at a wavelength of 365 nm under the condition of integrated light quantity shown in Table 1. During irradiation, the test strips were heated by the radiation heat of the metal halide lamp. The test strips after irradiation were measured for tensile shear adhesive strength using a universal tester under the environment of temperature at 23° C. and humidity at 50% at a tension speed of 10 mm/min. The maximum temperature of the bonded body during the peeling/disassembly test was measured by affixing a thermocouple on the monocrystalline silicon side with Kapton tape. Measurement and evaluation results are shown in Table 1.

Example 3

Peeling/Disassembly Test (3)

Test strips identical to those for the above tensile shear adhesive strength evaluation were prepareded. To the test samples obtained, irradiation was performed from the borosilicate glass side using a mercury xenon lamp (device used: EXECURE 4000 available from HOYA CANDEO OPTRONICS CORPORATION) with an illuminance of 100 mW/cm$^2$ at a wavelength of 365 nm under the condition shown in Table 1. In addition, heating was performed with the temperature of the hot plate from the monocrystalline silicon side at 200° C. The test strips after irradiation were measured for tensile shear adhesive strength using a universal tester under the environment of temperature at 23° C. and humidity at 50% at a tension speed of 10 mm/min. The maximum temperature of the bonded body during the peeling/disassembly test was measured by affixing a thermocouple on the monocrystalline silicon side with Kapton tape. Measurement and evaluation results are shown in Table 1.

Example 4

Peeling/Disassembly Test (4)

Test strips identical to those for the above tensile shear adhesive strength evaluation were prepareded. With a filter blocking most of the ultraviolet ray at 380 nm or lower placed on the obtained test samples, irradiation was performed to the test samples from the borosilicate glass side using an ultra-high pressure UV lamp (lamp used: USH-1005D available from USHIO INC.) with an illuminance of 10 mW/cm$^2$ at a wavelength of 365 nm under the condition shown in Table 1. During irradiation, the test strips were heated by the radiation heat of the flash lamp. The test strips after irradiation were measured for tensile shear adhesive strength using a universal tester under the environment of temperature at 23° C. and humidity at 50% at a tension speed of 10 mm/min. The maximum temperature of the bonded body during the peeling/disassembly test was measured by affixing a thermocouple on the monocrystalline silicon side with Kapton tape. Measurement and evaluation results are shown in Table 1.

Comparative Example 1

Peeling/Disassembly Test (5)

Test strips identical to those for the above tensile shear adhesive strength evaluation were prepareded. To the test samples obtained, irradiation was performed from the borosilicate glass side using a mercury xenon lamp (device used: EXECURE 4000 available from HOYA CANDEO OPTRONICS CORPORATION) with an illuminance of 100 mW/cm$^2$ at a wavelength of 365 nm under the condition of integrated light quantity shown in Table 1. During irradiation, the test strips were heated by the radiation heat of the mercury xenon lamp. The test strips after irradiation were measured for tensile shear adhesive strength using a universal tester under the environment of temperature at 23° C. and humidity at 50% at a tension speed of 10 mm/min. The maximum temperature of the bonded body during the peeling/disassembly test was measured by affixing a thermocouple on the monocrystalline silicon side with Kapton tape. Measurement and evaluation results are shown in Table 1.

Comparative Example 2

Peeling/Disassembly Test (6)

Test strips identical to those for the above tensile shear adhesive strength evaluation were prepareded. The test samples obtained were heated with the temperature of the hot plate from the monocrystalline silicon side at 200° C. for 2 hours. The test strips after heating were measured for tensile shear adhesive strength using a universal tester under the environment of temperature at 23° C. and humidity at 50% at a tension speed of 10 mm/min. The maximum temperature of the bonded body during the peeling/disassembly test was measured by affixing a thermocouple on the monocrystalline silicon side with Kapton tape. Measurement and evaluation results are shown in Table 1.

Comparative Example 3

Peeling/Disassembly Test (7)

Test strips identical to those for the above tensile shear adhesive strength evaluation were prepareded. With a filter blocking most of the ultraviolet ray at 280 nm or more placed on the obtained test samples, iiradiation was performed to the test samples from the borosilicate glass side using a low pressure mercury lamp that strongly irradiates wavelengths of 185 nm and 254 nm (available from EYE GRAPHICS Co., Ltd. low pressure mercury lamp: QGL400U-3A) with an illuminance of 200 mW/cm$^2$ at a wavelength of 254 nm under the condition of integrated light quantity shown in Table 1. In addition, heating was performed with the temperature of the hot plate from the monocrystalline silicon side at 200° C. The test strips after irradiation were measured for tensile shear adhesive strength using a universal tester under the environment of temperature at 23° C. and humidity at 50% at a tension speed of 10 mm/min. The maximum temperature of the bonded body during the peeling/disassembly test was measured by affixing a thermocouple on the monocrystalline silicon side with Kapton tape. Measurement and evaluation results are shown in Table 1.

Note that those with a tensile shear adhesive strength of 2.5 MPa or lower were evaluated as possibly peelable, and those with 0.5 MPa or lower as peelable.

TABLE 1

| Adhesive | | | (A) | (B) | (C) | (D) | (E) |
|---|---|---|---|---|---|---|---|
| Type of Adhesive Curing Method | | | Acrylic Ultraviolet curing | Epoxy Ultraviolet curing | Acrylic Two-part room temperature curing | Epoxy Two-part heat curing | Acrylic Ultraviolet curing |
| Storage elastic modulus [MPa] | | | 2050 | 2550 | 1880 | 3160 | 3830 |
| Tensile shear adhesive strength [MPa] | Ordinary state | | 8 | 9.5 | 8.3 | 9.4 | 7 |
| Heat resistance [MPa] 200° C., after 2 h exposure | | | 8 | 9.4 | 7 | 9 | 7.5 |
| Moisture resistance [MPa] 121° C., 100% RH, after 24 h exposure | | | 8 | 7.1 | 7.9 | 8.3 | 7 |
| Light resistance [MPa] Carbon arc, after 100 h exposure | | | 7.6 | 7.2 | 7.2 | 8.5 | 7 |
| Peeling/Disassembly Test | | | Tensile shear adhesive strength [MPa] | | | | |
| Example 1 | (1) High pressure mercury lamp (Peak wavelength 365 nm) | Tensile shear adhesive strength after disassembly test [MPa] | 0.1 Peelable | 0.1 Peelable | 0.1 Peelable | 0.1 Peelable | 0.1 Peelable |
| | | Integrated light quantity of wavelength at 365 nm [mJ/cm$^2$] | 25000 | 450000 | 10000 | 400000 | 120000 |
| | | Maximum temperature of bonded body [° C.] | 220 | 290 | 205 | 265 | 235 |
| Example 2 | (2) Metal halide lamp (Peak wavelength 365 nm) | Tensile shear adhesive strength after disassembly test [MPa] | 0.1 Peelable | 0.1 Peelable | 0.1 Peelable | 0.1 Peelable | 0.1 Peelable |
| | | Integrated light quantity of wavelength at 365 nm [mJ/cm$^2$] | 10000 | 300000 | 25000 | 190000 | 250000 |
| | | Maximum temperature of bonded body [° C.] | 225 | 288 | 245 | 275 | 265 |
| Example 3 | (3) Mercury xenon lamp (Peak wavelength 350-380 nm) | Tensile shear adhesive strength after disassembly test [MPa] | 0.1 Peelable | 0.1 Peelable | 0.1 Peelable | 0.1 Peelable | 0.1 Peelable |
| | | Integrated light quantity of wavelength at 365 nm [mJ/cm$^2$] | 400000 | 400000 | 400000 | 500000 | 400000 |
| | | Maximum temperature of bonded body [° C.] | 255 | 260 | 255 | 280 | 255 |

TABLE 1-continued

| | Adhesive | | (A) | (B) | (C) | (D) | (E) |
|---|---|---|---|---|---|---|---|
| Example 4 | (4) Ultrahigh pressure UV lamp (Peak wavelength 436 nm) | Tensile shear adhesive strength after disassembly test [MPa] | 1.2 Possibly peelable | 2.2 Possibly peelable | 1.2 Possibly peelable | 2.1 Possibly peelable | 1.1 Possibly peelable |
| | | Integrated light quantity of wavelength at 365 nm [mJ/cm$^2$] | 2000 | 2000 | 2000 | 2000 | 2000 |
| | | Maximum temperature of bonded body [° C.] | 295 | 295 | 295 | 295 | 295 |
| Comparative Example 1 | (5) Mercury xenon lamp (Peak wavelength 350-380 nm) | Tensile shear adhesive strength after disassembly test [MPa] | 6.3 Not Peelable | 6 Not Peelable | 6.4 Not Peelable | 7.8 Not Peelable | 7.7 Not Peelable |
| | | Integrated light quantity of wavelength at 365 nm [mJ/cm$^2$] | 400000 | 400000 | 400000 | 500000 | 400000 |
| | | Maximum temperature of bonded body [° C.] | 135 | 140 | 145 | 130 | 148 |
| Comparative Example 2 | Heating only | Tensile shear adhesive strength after disassembly test [MPa] | 8.2 Not Peelable | 9.3 Not Peelable | 6.9 Not Peelable | 8.8 Not Peelable | 7.7 Not Peelable |
| | | Integrated light quantity of wavelength at 365 nm [mJ/cm$^2$] | Light source not used. | | | | |
| | | Maximum temperature of bonded body [° C.] | 200 | 201 | 199 | 200 | 198 |
| Comparative Example 3 | (3) Low pressure mercury lamp (Peak wavelength 185 nm, 254 nm) | Tensile shear adhesive strength after disassembly test [MPa] | 8.4 Not Peelable | 9.1 Not Peelable | 6.8 Not Peelable | 8.6 Not Peelable | 7.9 Not Peelable |
| | | Integrated light quantity of wavelength at 254 nm [mJ/cm$^2$] | 400000 | 400000 | 400000 | 400000 | 400000 |
| | | Integrated light quantity of wavelength at 365 nm [mJ/cm$^2$] | 0 | 0 | 0 | 0 | 0 |
| | | Maximum temperature of bonded body [° C.] | 198 | 202 | 203 | 199 | 200 |

The following is indicated from Table 1. The present invention can easily disassemble and peel the bonded body even with an adhesive having superior heat resistance, moisture resistance, and light resistance. The present invention can easily disassemble and peel the bonded body without needing a foaming agent. Since Example 4 has the peak wavelength of the irradiated light greater than 400 nm, tensile shear adhesive strength after disassembly test will become large, and thus the bonded body is more difficult to disassemble and peel than Examples 1 to 3.

INDUSTRIAL APPLICABILITY

The present invention can be favorably employed for disassembling bonded bodies such as optical lens, prism, array, silicon wafer, and semiconductor mounted components. The method of the present invention can be further applied to temporary immobilization method in processing of components.

Since substrates that transmit a wavelength of 280 nm or more are inexpensive and abundantly present, the possibility of disassembling bonded bodies that use substrates transmitting a wavelength of 280 nm or more is high. The present invention readily enables application to disassembly of the bonded bodies described above or temporary immobilization method in processing of components.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A method for disassembling a bonded body formed by bonding substrates with an adhesive having a storage elastic modulus of 1000 MPa or higher, comprising irradiating the bonded body with light having a wavelength of 280 nm or more such that irradiation energy is 10000-5000000 mJ/cm$^2$ at a measured wavelength of 365 nm and while the bonded body is being heated to 150° C.-300° C.

2. A method for disassembling a bonded body according to claim 1, wherein the adhesive employed for the bonded body is an acrylic and/or epoxy adhesive.

3. A method for disassembling a bonded body according to claim 1, wherein the adhesive employed for the bonded body contains (A) a (meth)acrylate and (B) a polymerization initiator.

4. A method for disassembling a bonded body according to claim 1, wherein the adhesive employed for the bonded body is an ultraviolet curable acrylic adhesive containing (A-1) one or two or more (meth)acrylates having one or more (meth)acryloyl groups at a molecular terminal or on a side chain, and having a main chain backbone selected from the group consisting of polybutadiene, polyisoprene, and a hydrogenated form of these two, (A-2) isobornyl(meth)acrylate, (A-3) a hydroxyl group-containing (meth)acrylate, and (B-1) a photopolymerization initiator.

5. A method for disassembling a bonded body according to claim 1, wherein the adhesive employed for the bonded body is an ultraviolet curable acrylic adhesive containing (A-4) a multifunctional (meth)acrylate, and (B-1) a photopolymerization initiator.

6. A method for disassembling a bonded body according to claim 1, wherein the adhesive employed for the bonded body is room temperature curable acrylic adhesive containing (A-5) a dicyclopentenyloxyalkyl(meth)acrylate, (A-6) an alkyl(meth)acrylate, (A-7) a hydroxyl group-containing (meth)acrylate, (B-2) a radical polymerization initiator, and (C) a degradation accelerator.

7. A method for disassembling a bonded body according to claim 1, wherein the adhesive employed for the bonded body is an epoxy adhesive.

8. A method for disassembling a bonded body according to claim 1, wherein at least one of the substrates is a transparent substrate that transmits light at 280 nm or more.

9. A method for disassembling a bonded body according to claim 1, wherein at least one of the substrates does not transmit light at 280 nm or more.

10. A method for disassembling a bonded body according to claim 1, wherein the light comprises one or more of a mercury lamp, a metal halide lamp, a xenon lamp, or a flash lamp enclosing xenon gas.

11. A method for disassembling a bonded body according to claim 1 wherein the peak wavelength of the irradiated light is 400 nm or lower.

12. A method for disassembling a bonded body according to claim 1, wherein the peak wavelength of the irradiated light is 280-400 nm.

13. A method for disassembling a bonded body according to claim 1, wherein the bonded body is irradiated with the light during disassembly at an illuminance of 10-1000 mW/cm$^2$ measured at a wavelength of 365 nm.

14. A method for disassembling a bonded body according to claim 1, wherein the adhesive has a retention rate of Tensile Shear Adhesive Strength according to JIS K 6850 at 50% or higher after exposing to an atmosphere of 200° C. for 2 hours.

15. A method for disassembling a bonded body according to claim 1, wherein the adhesive has a retention rate of Tensile Shear Adhesive Strength according to JIS K 6850 at 50% or higher after exposing to an atmosphere of 121° C., humidity at 100%, 2 atm for 24 hours.

16. A method for disassembling a bonded body according to claim 1, wherein the adhesive has a retention rate of Tensile Shear Adhesive Strength according to JIS K 6850 at 50% or higher after exposing to one of an atmosphere of 200° C. for 2 hours or to an atmosphere of 121° C., humidity at 100%, 2 atm for 24 hours.

* * * * *